Aug. 11, 1970     EVA TH. JUHOS     3,523,863

DRYING AND PRESERVATION OF ELECTROPHORESIS GEL FILMS

Filed Nov. 9, 1966

EVA TH. JUHOS
INVENTOR.

BY Louis Mok

ATTORNEY

| United States Patent Office | 3,523,863 |
|---|---|
| | Patented Aug. 11, 1970 |

3,523,863
DRYING AND PRESERVATION OF
ELECTROPHORESIS GEL FILMS
Eva Th. Juhos, Mountain View, Calif., assignor to Beckman Instruments, Inc., a corporation of California
Filed Nov. 9, 1966, Ser. No. 593,036
Int. Cl. B32b 27/30
U.S. Cl. 161—249   6 Claims

ABSTRACT OF THE DISCLOSURE

This invention relates generally to zone electrophoresis and particularly to the drying and preservation of gel films which contain electrophoretic patterns or electropherograms formed during zone electrophoresis runs.

---

Electrophoresis, in general, is the migration of particles in an electrolytic carrier medium under the influence of an electric field. This phenomenon is used to separate particles which are chemically similar but which exhibit distinctive surface electrical properties. As a result of these distinctive electrical properties, the mobilities of various classes of charged particles in the carrier medium, under the influence of the electric field, will be different. Particles having the same electrical properties migrate together in specific, identifiable zones.

Various carrier mediums, including free solutions, buffer-saturated paper strips and gel-like substances such as agar, have been used for carrying out electrophoresis. More recently, acrylamide, a synthetic gelling agent capable of resolving many more fractions than conventional electrophoresis media, was introduced. In one typical commercial form, this gelling agent is a mixture of two monomers: acrylamide and $N_1N$ - methylenebisacrylamide. By adding appropriate catalysts to the aforedescribed mixture a polymerization and cross-linking reaction is produced which results in the formation of a gel. This gel is stable, strong, transparent, completely insoluble in water, inert to most chemicals and non-ionic. The relative concentrations of the two monomers determine the pore size of the resulting gel and hence its molecular sieving effect. Thus, acrylamide gels can be custom-made for particular types of samples to separate and resolve particles of specific molecular size.

A further useful property of acrylamide gels is that once formed and the electrophoretic pattern developed, they are stable indefinitely in either hydrated or dehydrated form. If the gel sheet can be dehydrated without distorting the electrophoretic pattern, the resulting thin film is more suitable for analysis and storage for later reference than the original, thick hydrated gel. However, the gel by itself shrivels uncontrollably while dehydrating, necessitating the use of special techniques. The known techniques for drying the gel sheets are time consuming, however, generally requiring in excess of three hours and in some cases as much as twenty-four hours.

Accordingly, it is an object of the present invention to substantially reduce the time required to dry electrophoresis gel sheets without distortion of the sheets and the electropherograms contained therein.

It is also an object of the present invention to improve the storeability and preservation of electrophoresis gel films bearing electrophoretic patterns.

In accordance with one specific exemplary form of the present invention, the hydrated gel sheet is sandwiched between a pair of transparent, permeable membranes thereby forming a three-layer lamination. The membranes are made of a material which shrinks much less than the gel. A stream of warm air, directed over the surfaces of the lamination, expedites the drying of the gel sheet, liquid vapors escaping through the pores of the permeable membranes. The edges of the membranes are restrained by a suitable frame device so that the membranes will be under uniform tension during the drying process. This precludes wrinkling and distortion of the membranes. At the beginning of the drying process, the membranes adhere firmly and permanently to the surfaces of the gel, causing the gel sheet and membranes to shrink in unison. The end product is a thin, smooth, permanent film with membrane-covered faces which can withstand repeated handling and which readily lends itself to indefinite filing or storage.

The novel features which are believed to be characteristic of the invention are set forth with particularity in the appended claims. The invention itself, however, together with further objects and advantages thereof can best be understood by reference to the following description taken in connection with the accompanying drawings in which:

Figure 1:
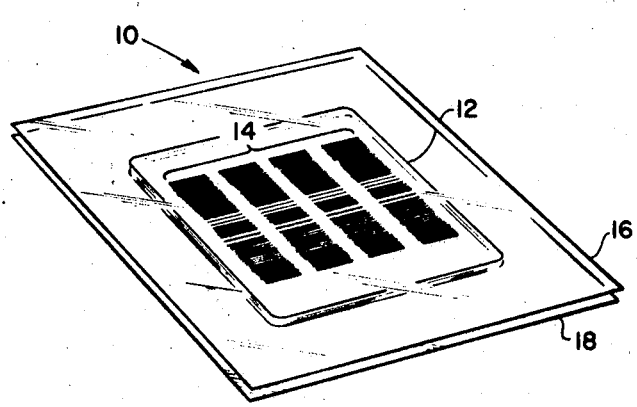
FIG. 1 is a perspective view of a lamination comprising an electrophoresis gel sheet sandwiched between a pair of transparent membranes in accordance with one aspect of the present invention.

Referring now to FIG. 1 of the drawings, a laminate structure 10 is shown comprising a gel sheet 12, bearing an electrophoretic pattern or electropherogram 14, sandwiched between a pair of membranes 16 and 18 having surface areas somewhat larger than the gel sheet. The gel sheet 12 is preferably centered with respect to the membranes 16 and 18, the peripheral portion of the membranes thereby overhanging the edges of the gel sheet. The sheet 12, initially hydrated as a result of the gel formation, followed by the immersion in various buffers and dyes employed in the electrophoresis process, has an initial thickness of about 3 mm. The membranes 16 and 18 are preferably made of a material which is transparent and permeable and has shrinking properties compatible with that of the gel material. For example, the non-moisture proof, non-heat sealable class of cellophanes meets the foregoing requirements. These cellophanes, saturated with water before use, will shrink somewhat during drying but much less so than the gel. One specific non-moisture cellophane which has been used successfully is Du Pont 300 PD cellophane.

Streams of warm air, directed over the flat surfaces of the lamination 10, rapidly dry the gel sheet 12, the liquid vapors passing through the porous membranes 16 and 18 to the atmosphere. To prevent wrinkling and distortion of the membranes 16 and 18 during the drying process, the peripheral portions of the membranes are restrained resulting in uniform tension of the membranes as they shrink. When completely dried, the composite film structure is reduced to a thickness on the order of 0.3 to 0.4 mm. and the membranes and gel film are firmly joined together. Following trimming of the peripheral portion of the membranes 16 and 18, the patterns on the gel film are now ready for analysis by optical scanning means, or the film may be stored or filed for future use.

Figure 2:
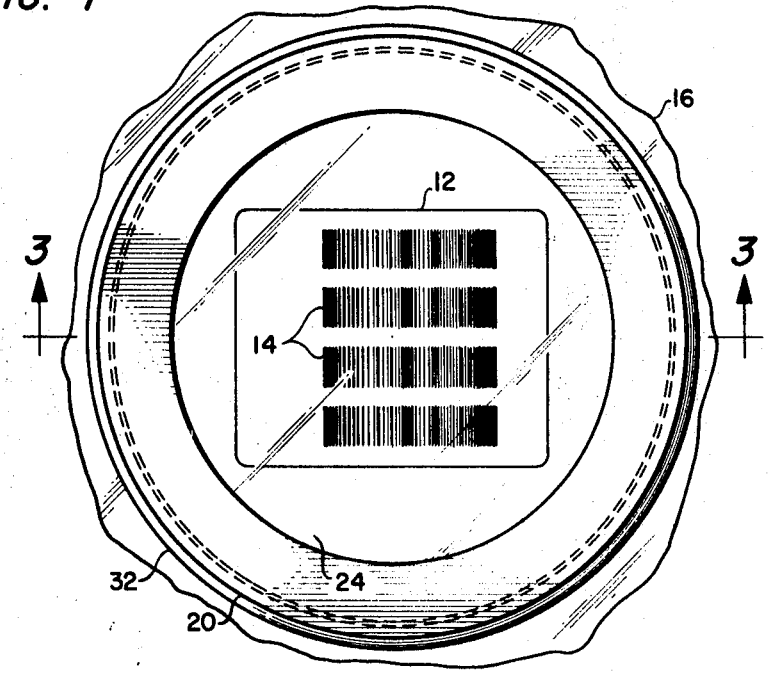
FIG. 2 is a top view of a drying device in accordance with another aspect of the present invention.
Figure 3:
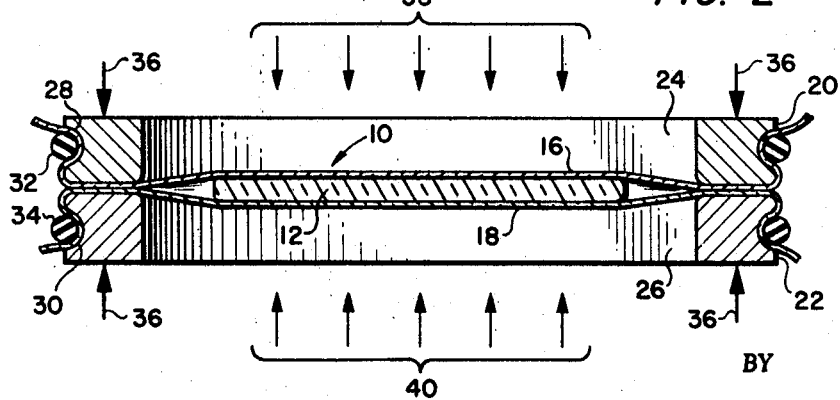
FIG. 3 is an elevation view, in section, of the device shown in FIG. 2 taken along the plane 3—3.

FIGS. 2 and 3 show a preferred apparatus which may be used to support the laminate structure 10 and restrain the peripheral portion thereof during the drying process. The device shown comprises a matching pair of ring-like frame members 20 and 22 having open central portions 24 and 26, respectively. Although a circular frame is shown, it is to be understood that other shapes, for example, rectangular, may be used with equal facility. The outer, side surfaces of the frame members 20 and 22 are provided with circumferential grooves 28 and 30, respectively, for receiving resilient clamping rings such as the O-rings 32 and 34. The rings 32 and 34 serve to hold in place the membranes 16 and 18 stretched across the openings 24 and 26. A frame device of this type permits the membranes to be subjected to a small amount of initial tension and assures that the membranes will be under uniform tension while drying.

Any suitable clamping device may be utilized to clamp the rims of the frame members 20 and 22 together, the arrows 36 representing the applied clamping forces. The peripheral portions of the membranes 16 and 18 are squeezed between the frame members and thereby restrained during drying. It will be seen that on account of the openings 24 and 26, both sides of the lamination 10 are exposed to the atmosphere, and warm air streams, designated by the reference numerals 38 and 40, from any suitable blower means, may be directed over the surfaces of the lamination.

It will be obvious to those skilled in the art that various modifications may be made to the specific exemplary embodiments of the invention described. While particular embodiments have been discussed, it will be understood that the invention is not limited thereto and that it is contemplated to cover in the appended claims any such modifications as fall within the true spirit and scope of the invention.

What is claimed is:

1. A method of treating a hydrated gel sheet bearing an electropherogram, comprising the steps of:
    forming a lamination by sandwiching said gel sheet between transparent, permeable membranes having shrink rates significantly less than that of the gel sheet; and
    drying said lamination thereby causing the membranes to adhere to either face of the gel sheet while maintaining said membranes under uniform tension.

2. A method of treating a hydrated gel sheet bearing an electropherogram, comprising the steps of:
    forming a lamination by sandwiching said gel sheet between wet, non-moisture proof cellophane sheets held under uniform tension; and
    drying said lamination thereby causing the cellophane sheets to adhere to either face of the gel sheet while holding said cellophane sheets under uniform tension.

3. A method as set forth in claim 2 in which said drying is accelerated by force-flowing warm air over the outer surfaces of said lamination.

4. A method of preserving a gel sheet bearing an electropherogram comprising the steps of:
    sandwiching said gel sheet between a pair of transparent, permeable membranes, said membranes having peripheral edges extending beyond said gel sheet; and
    drying the laminate structure formed in the preceding step thereby causing the membranes to adhere to either face of the gel sheet while holding said peripheral edges of said membranes to prevent distortion and wrinkling thereof during drying.

5. A laminate structure comprising:
    a pair of transparent, permeable membranes and
    a gel sheet bearing an electrophoretic pattern sandwiched between said transparent membranes with the faces of the gel sheet joined to the transparent membranes.

6. A structure as defined in claim 5 in which said membranes are made of a non-moisture proof cellophane.

References Cited

UNITED STATES PATENTS

| 2,789,369 | 4/1957 | Walker | 34—80 |
| 2,928,717 | 3/1960 | Eberl et al. | 21—58 |
| 3,157,519 | 11/1964 | Butt | 53—37 X |
| 3,325,330 | 6/1967 | Robb | 156—306 X |
| 3,342,997 | 9/1967 | Taylor et al. | 356—105 X |

FOREIGN PATENTS

| 529,775 | 1955 | Italy. |
| 810,531 | 3/1937 | France. |
| 942,762 | 11/1963 | Great Britain. |

JOHN T. GOOLKASIAN, Primary Examiner

J. C. GIL, Assistant Examiner

U.S. Cl. X.R.

34—22; 99—199; 156—160, 220, 309; 161—413; 204—180; 206—45.33, 84; 269—37